(12) United States Patent
Martinez et al.

(10) Patent No.: US 6,978,165 B2
(45) Date of Patent: Dec. 20, 2005

(54) COMMUNICATION DEVICE WITH INTERNAL ANTENNA SYSTEM

(75) Inventors: Juan M. Martinez, Boynton Beach, FL (US); Sara Martinez, Boynton Beach, FL (US); Christos Kontogeorgakis, Delray Beach, FL (US); Lorenzo A. Ponce De Leon, Lake Worth, FL (US)

(73) Assignee: Motorola, Inc., Schaumburg, IL (US)

(\*) Notice: Subject to any disclaimer, the term of this patent is extended or adjusted under 35 U.S.C. 154(b) by 147 days.

(21) Appl. No.: 10/660,174

(22) Filed: Sep. 11, 2003

(65) Prior Publication Data

US 2005/0059444 A1     Mar. 17, 2005

(51) Int. Cl.[7] .................................................. H04B 1/38
(52) U.S. Cl. ..................... 455/575.7; 343/702
(58) Field of Search ...................... 455/575.1, 575.5, 455/575.7, 90.3, 128, 344, 347; 343/702, 343/846, 853

(56) References Cited

U.S. PATENT DOCUMENTS 5,809,433 A * 9/1998 Thompson et al. ...... 455/575.7
6,314,275 B1 * 11/2001 Pedersen et al. ........... 455/90.3

\* cited by examiner

*Primary Examiner*—Lee Nguyen
(74) *Attorney, Agent, or Firm*—Randi L. Karpinia

(57) ABSTRACT

A communication device (100, 500, 800) includes a housing (115) and an antenna system. The housing (115) comprises at least one metallic portion (110) and at least one non-metallic portion (105). The antenna system is for tuning the communication device (100, 500, 800) to radiate at one or more frequencies. The antenna system is located within the non-metallic portion (105) of the housing (115).

17 Claims, 5 Drawing Sheets

COMMUNICATION DEVICE WITH INTERNAL ANTENNA SYSTEM

BACKGROUND OF THE INVENTION

1. Field of the Invention

The present invention is related to a communication device, and more particularly to a communication device having an internal antenna system.

2. Description of the Related Art

Communication devices, such as radiotelephones, are being driven by the marketplace towards smaller and smaller sizes. Consumer and user demand has continued to push a dramatic reduction in the size of such communication devices. Consumers further are very interested in smaller phones with concealed (internal) antennas that are not susceptible to damage by catching on clothing or other objects. The reduction in size and desirability of an internal antenna provides additional challenges to the device designers to achieve adequate antenna electrical performance.

With the increased use of wireless communication devices, available spectrum to carry communication signals is becoming limited. In many cases, network operators are providing services on multiple frequency bands to accommodate its customers. For example, network operators providing service on the Global System of Mobile (GSM) communication system in an 850 MHz (Mega Hertz) or a 900 MHz frequency band may also provide service on the Digital Communication System (DCS) at an 1800 MHz frequency band or a Personal Communication System (PCS) at a 1900 MHz frequency band. Network operators are further offering other services such as access to Global Positioning Systems (GPS) that operates at 1.575 GHz, Bluetooth operation at 2.4 GHz, and Universal Mobile Telecommunications Service (UMTS) that uses the spectrum from 1.92 GHz to 1.98 GHz for transmission and 2.11 GHz to 2.17 GHz for reception. Further, to meet the demand for the various services, device manufacturers are designing similar communication devices for multiple frequency bands and communication protocols. Accordingly, it is desirable for communication devices, such as cellular radiotelephones, to be able to communicate at multiple frequencies using multiple communication protocols within a compact size.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

DETAILED DESCRIPTION OF THE PREFERRED EMBODIMENT(S)

Figure 1:
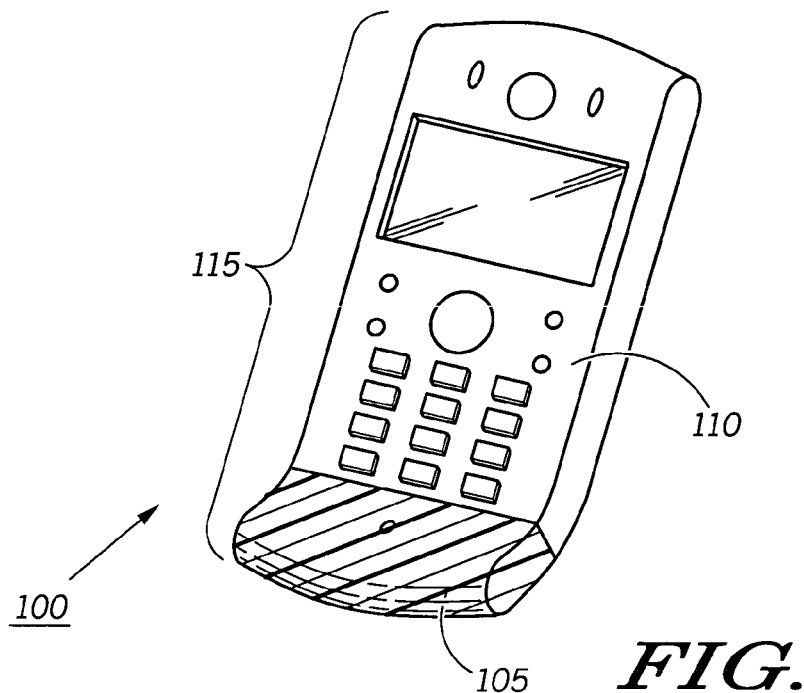
FIG. 1 is a perspective view of one embodiment of a communication device.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The concept of the present invention can be advantageously used on any electronic product requiring the transceiving of RF signals. The radiotelephone portion may be constructed in accordance with an analog communication standard or a digital communication standard. The radiotelephone portion generally includes a radio frequency (RF) transmitter, a RF receiver, a controller, an antenna, a battery, a duplex filter, a frequency synthesizer, a signal processor, and a user interface including at least one of a keypad, display, control switches, and a microphone. The radiotelephone portion can also include a messaging receiver. The electronics incorporated into a cellular phone, two-way radio or selective radio transceiver, or the like are well known in the art, and can be incorporated into the communication device of the present invention.

The communication device 100, by way of example only, is embodied in a cellular radiotelephone having a conventional cellular radio transceiver circuitry, as is known in the art, and will not be presented here for simplicity. Although the invention is illustrated herein with reference to a cellular radiotelephone, the invention is alternatively applied to other communication devices such as, for example, messaging devices, personal digital assistants and personal computers with communication capability, mobile radio handsets, cordless radiotelephone and the like.

The cellular telephone, includes conventional cellular phone hardware (also not represented for simplicity) such as user interfaces that are integrated in a compact housing, and further includes an antenna system, in accordance with the present invention. Each particular wireless device will offer opportunities for implementing this concept and the means selected for each application.

The communication device 100, as illustrated, includes a housing 115 for covering, protecting and supporting the internal components encased within. By way of example, the preferred embodiment of the present invention is described in relation to a fixed housing such as the housing 115 of FIG. 1; however, it will be appreciated by one of ordinary skill in the art that the present invention is similarly applicable to a removable housing accessory such as the removable faceplate described in U.S. Pat. No. 5,884,772, issued Mar. 23, 1999 to Floyd et al. and titled "Electronic Device Having Multiple User Interface Configurations" which is assigned to the assignee of the present invention, and which is incorporated by reference herein. Similarly, the present invention is equally applicable to interchangeable covers for housings such as described in U.S. Pat. No. 5,745,566, issued Apr. 28, 1998 to Petrella et al. and titled "Portable Communication Device Having Removable Escutcheon Elements" which is assigned to the assignee of the present invention, and which is incorporated by reference herein.

In accordance with the present invention, the housing 115 comprises at least one non-metallic portion 105 and at least one metallic portion 110. The at least one non-metallic portion 105, for example, can be manufactured by a plastic injection molding technique as is well known in the art. The at least one metallic portion 110 provides an appealing look for the device user in a more compact size than a housing comprised totally of non-metallic material. The at least one metallic portion 110, for example, can be manufactured using any metallic material which from an electrical point of view is any physical element showing very high electrical conductivity. Such materials include Gold, Silver, Copper, and Iron through Magnesium alloys and can include fabrics that have very low resistance to the flow of electrons at the frequency of interest. The at least one metallic portion 110 provides strength, rigidity and durability over other lighter and thinner material such as plastic or other non-metallic materials.

Figure 2:
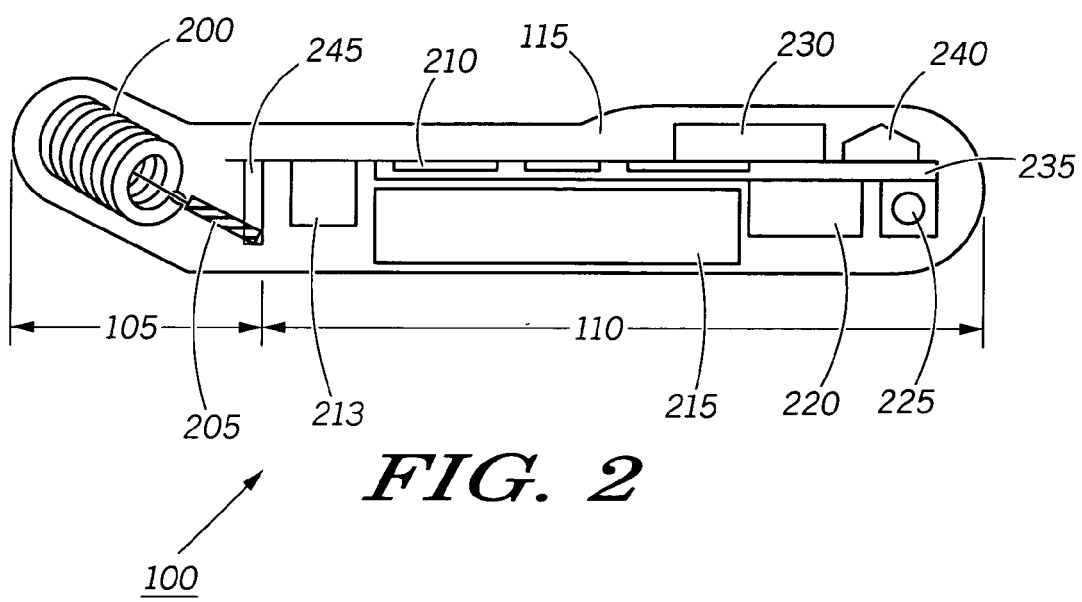
FIG. 2 is a cross sectional view of the communication device of FIG. 1.

FIG. 2 is a cross sectional view of the communication device 100 of FIG. 1. As illustrated, the communication device 100 includes the housing 115 and a plurality of internal components. The housing 115 encases the plurality of internal components, providing covering, protection and structural support. The plurality of internal components, for example, can include a radio frequency (RF) transceiver 210, (or alternatively a separate RF transmitter and RF receiver (not shown)), a radio frequency (RF) test port 213, a battery 215, a SIM (Subscriber Identity Module) card 220, an audio jack 225, a speaker 240, a display 230, and the like. The plurality of internal components, in accordance with the present invention, preferably further includes a resonator 200, an antenna shaft 205, and an antenna fork 245. The plurality of internal components further includes, as described previously herein, various components providing functionality of a controller, one or more filters, a frequency synthesizer, a signal processor, and the like. A printed circuit board 235 provides electrical connection and mechanical structure between the plurality of internal components within the communication device 100 as illustrated.

In accordance with the present invention, an antenna system for the communication device 100 includes the resonator 200, the antenna shaft 205, and the antenna fork 245. The resonator 200 can be built in different ways and using different technologies as is well known in the art. For example, the resonator 200 can be a helix-whip, a meandered encapsulated flex, a meandered none encapsulated flexible circuit, one or more meandered wires, any combination of active and parasitic radiators, and the like. The antenna system functions using the combination of all the mechanical parts that constitute the antenna system and its mechanical contacts necessary to carry the RF (radio frequency) signal from and towards the printed circuit board (PCB) 235 including the resonator 200, the antenna shaft 205, coupled between the resonator 200 and the antenna fork 245, and the antenna fork 245, coupled between the antenna shaft 205 and the printed circuit board 235. As illustrated, the antenna fork 245 makes contact to the printed circuit board 235. It will be appreciated by those of ordinary skill in the art that the mechanism making contacting to the printed circuit board alternatively can be a spring, clip or any other conductive structure in accordance with the present invention. The antenna system tunes the structure to radiate at the appropriate frequency. The antenna system is coupled and matched to circuitry within the plurality of internal components such as the RF transceiver 210 as is known in the art.

As illustrated, the antenna elements of the antenna system utilized for communication are located within the non-metallic portion 105 of the housing 115 in accordance with the present invention. Locating the resonator 200, the antenna shaft 205, and the antenna fork 245 within the non-metallic portion 105 decreases the probability of the antenna system being detuned from the frequency of interest or shielded, thereby providing consistent overall radiating efficiency.

In one embodiment of the present invention, the antenna system of the communication device 100 further is electromagnetically coupled to the metallic portion 110 of the housing 115. Coupling the metallic portion 110 to the internal antenna 200 and the antenna fork 205 provides and increase in effective antenna surface area, thereby enhancing receive and transmit performance of the overall antenna system. In this manner, the metallic portion 110 acts as a second resonator for the antenna system.

Figure 3:
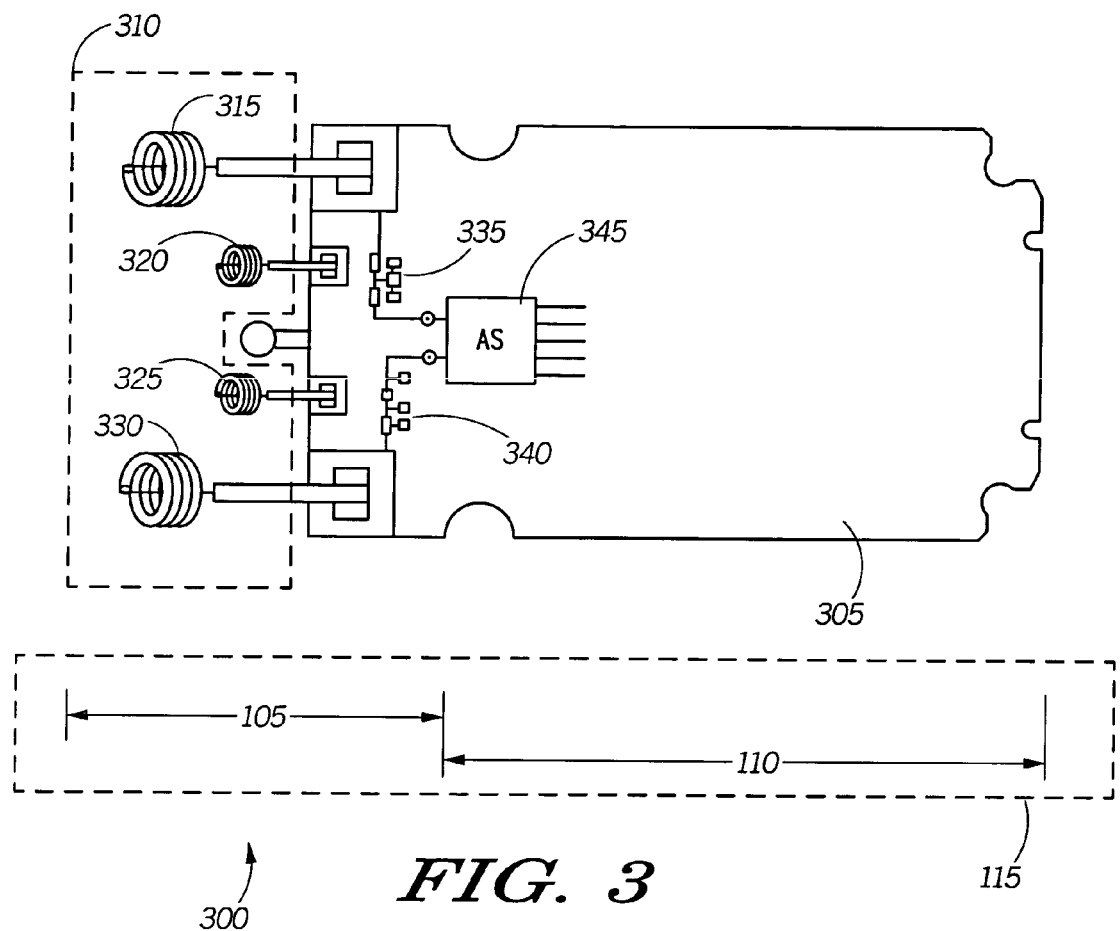
FIG. 3 illustrates an electronics system for use within a communication device.

FIG. 3 illustrates one embodiment of an electronics system 300 for use within a communication device in accordance with the present invention. FIG. 3 further illustrates the relationship of the various portions of the electronics system 300 with the various portions of the housing 115. As illustrated, the electronics system 300, in accordance with a preferred embodiment of the present invention, comprises a printed circuit board 305 similar to the printed circuit board 235 as previously described herein. The printed circuit board 235 and associated internal components connected therein preferably is housed within the metallic portion 110 of the housing 115 as previously described herein. The electronics system 300 further preferably comprises a plurality of antennas 310 contained within the non-metallic portion 105 of the housing 115. The plurality of antennas 310, for example, can include a first antenna 315 tuned to operate on the 800 and/or 1800 MHz frequency bands, a second antenna 320 tuned to operate on the GPS and/or Bluetooth frequency bands, a third antenna 325 tuned to operate on the UMTS frequency band and/or a fourth antenna 330 tuned to operate on the 900 and/or 1900 MHz frequency bands. It will be appreciated by those of ordinary skill in the art that the plurality of antennas 310 can include any combination of antenna systems tuned to any combination of frequency bands as desired in accordance with the present invention. The multi-band response, for example, can include operation at 800 MHz, 900 MHz, 1575 MHz, 1800 MHz, 1900 MHz, 2100 MHz, 2400 MHz, and the like. It will further be appreciated by those of ordinary skill in the art that the plurality of antennas 310 can be utilized for all communication protocols such as WLAN (Wireless Local Area Network), AMPS (Advanced Mobile Phone Service), DAMPS (Digital-Advanced Mobile Phone Service), TDMA (time division multiple access), CDMA (Code Division Multiple Access), GSM (Global System for Mobile Communication), Bluetooth (a technology that connects electronic devices to each other within short distances), GPS (Global Positioning System), UMTS (Universal Mobile Telecommunications System), and the like. It will be further appreciated that the plurality of antennas 310 can be utilized for data transmit and receive such as operating with GPRS (General Packet Radio Service), EDGE (An edge device is a physical device that can pass packets between a legacy type of network such as an Ethernet network and an ATM network, using Data Link layer and Network layer information), 3G (third-generation wireless) for facilitating the use of wireless digital cameras, Internet access, and the like.

Each of the plurality of antennas 310 preferably have multiple outputs that are connected to the PCB 305 and their signals are distributed to the proper circuits by using one or more multi-port antenna switches such as a multi-port antenna switch 345 as illustrated in FIG. 3. Coupled between each of the plurality of antennas 310 and the multi-port antenna switch 345 are one or more matching circuits/RF ports such as a first matching circuit and RF port 335 and a second matching circuit and RF port 340 as illustrated in FIG. 3.

The electronics system 300 as illustrated and described herein provides efficient, compact space utilization for a communication device with multiple frequency band and operational protocol capabilities while ensuring electronic performance meets customer expectations.

Figure 4:
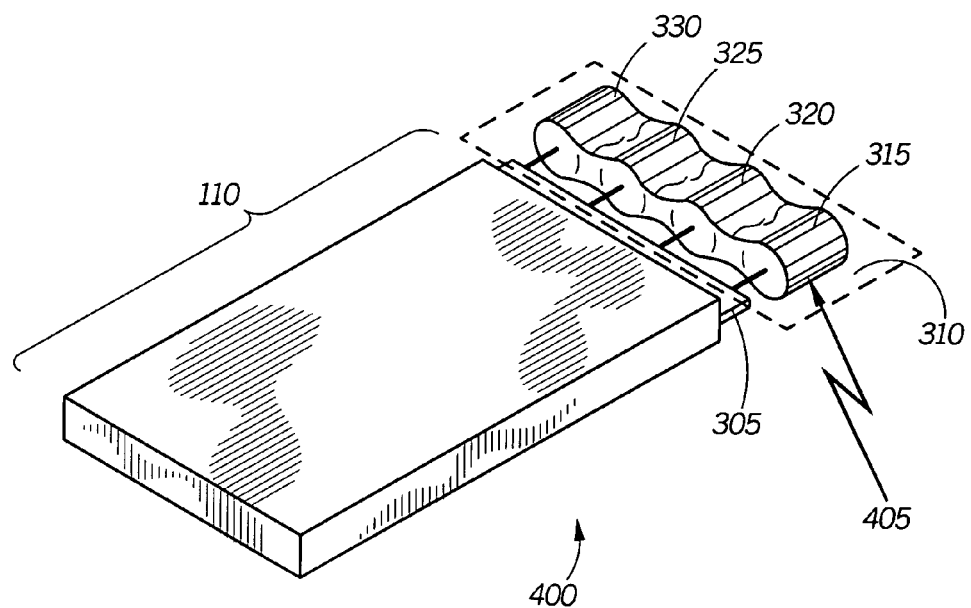
FIG. 4 illustrates a partial view of a communication device with an internal antenna system.

FIG. 4 illustrates a partial view of a communication device 400 with an internal antenna system in accordance with the present invention. As illustrated, a cluster of internal antennas (resonators) such as the plurality of antennas 310 as illustrated and described previously herein for FIG. 3 can be encapsulated together using a flexible encapsulates to form one antenna cluster 405. For example, the first antenna 315, the second antenna 320, the third antenna 325, and the fourth antenna 330 can be encapsulated together into the antenna cluster 405. The antenna cluster 405 is coupled to the PC board 305 as previously described herein for FIG. 3. The PC board 305 is contained within the metal portion 110 of the communication device as previously described herein for FIG. 3.

The antenna cluster 405 is characterized for having its elements (i.e.: the plurality of antennas 310) embedded inside the same dielectric over-mold. Preferably, each of the plurality of antennas within the antenna cluster has independent frequency outputs for improved RF filtering. The individual antennas of the cluster can be organized in $2_K$ different combinations where K is the number of elements integrating the antenna cluster 405. The antenna cluster 405 can be organized with its elements in one or several planes i.e. one element beside the other or one element on top of the other. The distance between the elements of the antenna cluster 405 controls the total volume of the elements, i.e. the proximity of individual elements reduces the individual size of each element. The positioning and distance between the elements of the antenna cluster 405 controls the frequency response and the antenna size. It will be appreciated by those of ordinary skill in the art that the individual antennas of the antenna cluster 405 can be built by using one or more known technologies including helix-whip, flex printed, meander lines, and/or meander wires. By mixing technologies, the frequency response is also optimized.

Each antenna of the antenna cluster can have single or multiple resonances overlapping or not the frequencies of other elements to create broadband responses. The antenna cluster has a many outputs as elements or artificially added outputs to select only the frequencies of interest and helping the process of filtering and depuration of the signal that needs to be post-processed by the device circuitry. The antenna cluster makes the communication device capable of operating in several frequencies, i.e. eight, ten or more frequencies depending upon the number of elements of the antenna cluster 405.

Figure 5:
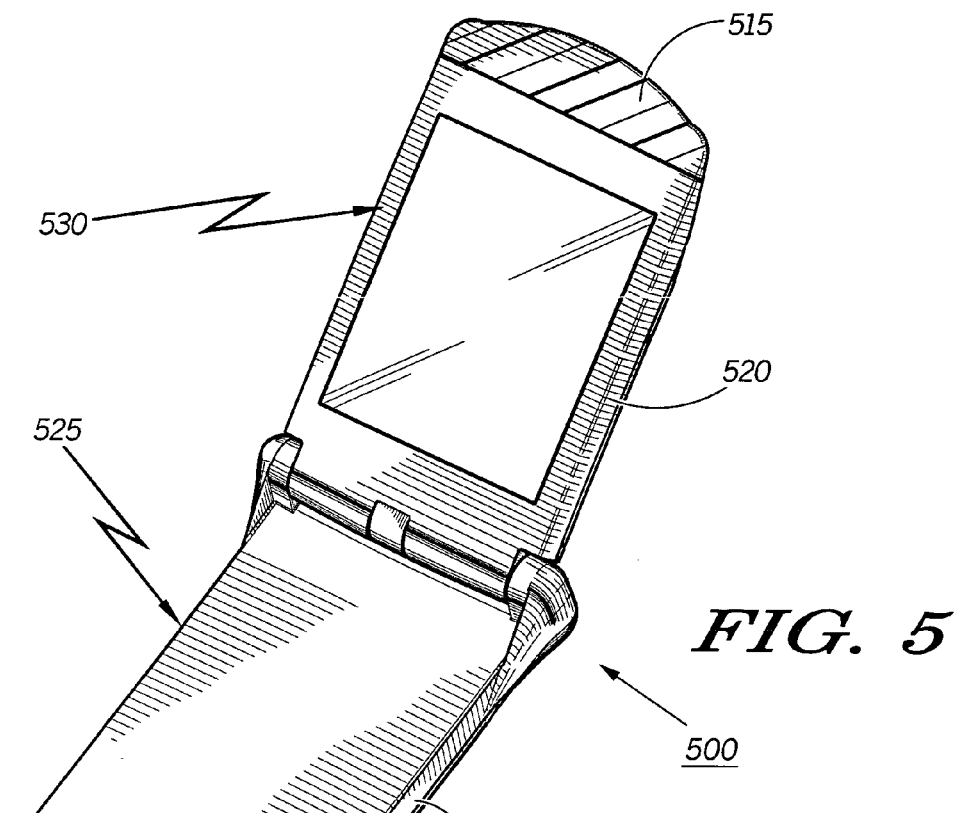
FIG. 5 is a perspective view of a second embodiment of a communication device with a movable housing in an opened position.
Figure 6:
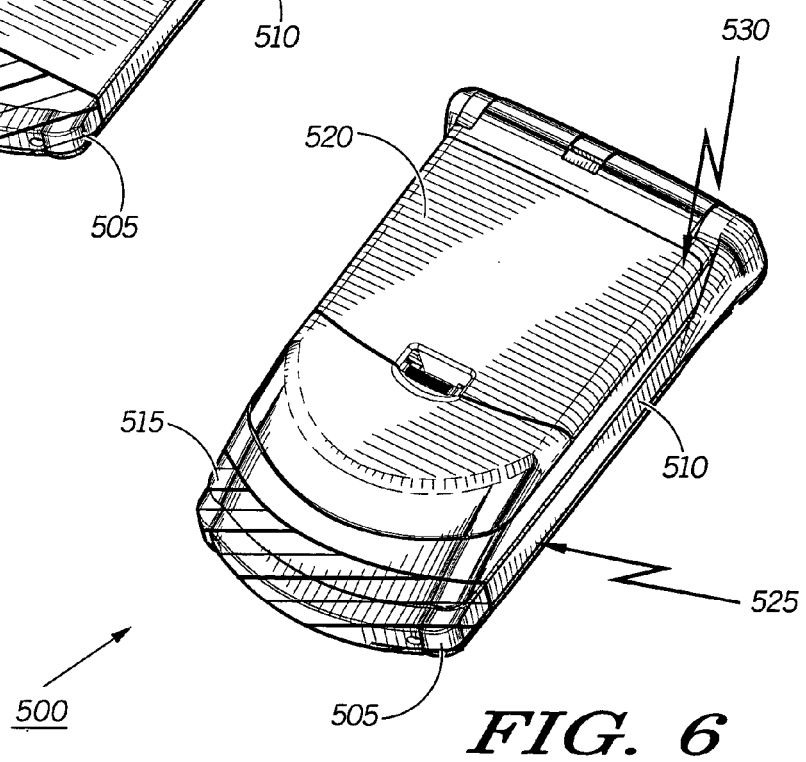
FIG. 6 is a perspective view of the communication device of FIG. 5 with a movable housing in a closed position.
Figure 7:
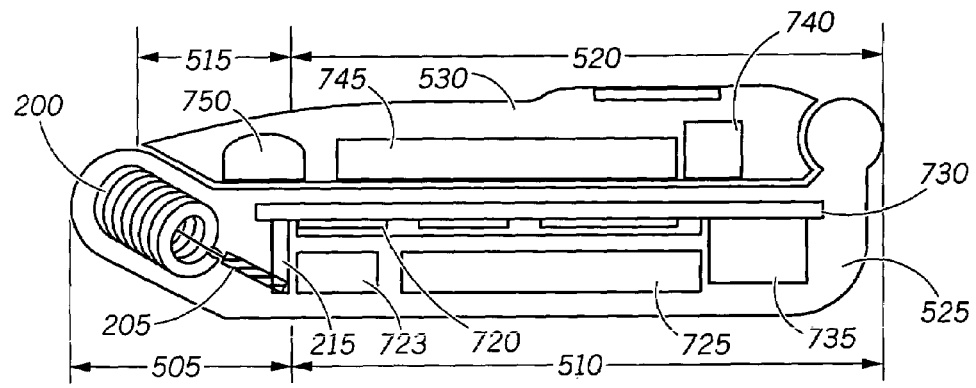
FIG. 7 is a cross sectional view of the communication device of FIG. 6.

FIGS. 5 through 7 illustrate a second embodiment of a communication device. Specifically, FIGS. 5 through 7 illustrate a flip-type communication device 500. As illustrated, the flip-type communication device 500 comprises a base housing 525 and a flip housing 530. The flip housing 530 is preferably a hinged cover that closes to make the flip-type communication device 500 more compact and to protect a keypad or other user interface (not shown) located on the base housing 525 from inadvertent entries. The flip housing 530 rotates relative to the base housing 525 in a plane perpendicular to the plane of the base housing 525. As an example, a communication device such as a radiotelephone can comprise two planar elements coupled by a hinge. When the radiotelephone is not in use, the two planar elements are closed and lie in parallel (see FIG. 6). When the radiotelephone is in use, the two planar elements are opened in relation to each other, exposing such elements as a touch pad, viewing screen, microphone and/or speaker (see FIG. 5).

It will be appreciated by those of ordinary skill in the art that the base housing 525 and the flip housing 530 can each have, and/or contain printed circuit boards (PCBs) with electronic components, audio devices, camera's, visual displays, metal shields, and metal chassis, as well as wiring to connect the electrical component together to form electrical circuits, and the like. For example, in accordance with the present invention the base housing 525 and/or the flip housing 530 can contain at least a portion of the electronic system 300 as described previously herein and illustrated in FIG. 3.

Referring to FIGS. 5 and 6, the base housing 525 of the flip-type communication device 500, in accordance with the present invention, comprises at least one base metallic portion 510 and at least one base non-metallic portion 505. The base metallic portion 510 and the base non-metallic portion 505 are manufactured similarly to the metallic portion 110 and the non-metallic portion 105 as described previously herein for FIG. 1.

Similarly, the flip housing 530 of the flip-type communication device 500, in accordance with the present invention, comprises at least one flip metallic portion 520 and at least one flip non-metallic portion 515. The flip metallic portion 520 and the flip non-metallic portion 515 are manufactured similarly to the metallic portion 110 and the non-metallic portion 105 as described previously herein for FIG. 1.

As illustrated in FIG. 6, when the flip assembly is in the closed position, the base metallic portion 510 and the flip metallic portion 520 preferably are substantially coincidental. Similarly, when the flip assembly is in the closed position, the base non-metallic portion 505 and the flip non-metallic portion 515 are substantially coincidental.

FIG. 7 Illustrates a cross sectional view of the flip-type communication device 500 of FIGS. 5 and 6. Specifically, FIG. 7 illustrates a cross sectional view of the flip-type communication device 500 in the closed position as illustrated previously in FIG. 6. As illustrated, the flip-type communication device 500 includes the base housing 525, the flip housing 530, and a plurality of internal components. The plurality of internal components preferably includes the electronic system 300 as described previously herein. It will be appreciated by those of ordinary skill in the art that the plurality of internal components can be contained within the base housing 525, within the flip housing 530, or within a combination of both. The plurality of internal components, for example can include a radio frequency (RF) transceiver 720, (or alternatively a separate RF transmitter and RF receiver (not shown)), a radio frequency (RF) test port 723, a battery 725, a battery charger plug and accessories interface 735, a speaker 750, a display 745, a vibrator 740, and the like. The plurality of internal components, in accordance with the present invention, preferably further includes the resonator 200, the antenna shaft 205, and the antenna fork 215 as described previously herein. The plurality of internal components further includes, as described previously herein, various components providing functionality of a controller, one or more filters, a frequency synthesizer, a signal processor, and the like. One or more printed circuit boards 730 provide electrical connection and mechanical structure between the plurality of internal components within the flip-type communication device 500 as illustrated.

Figure 8:
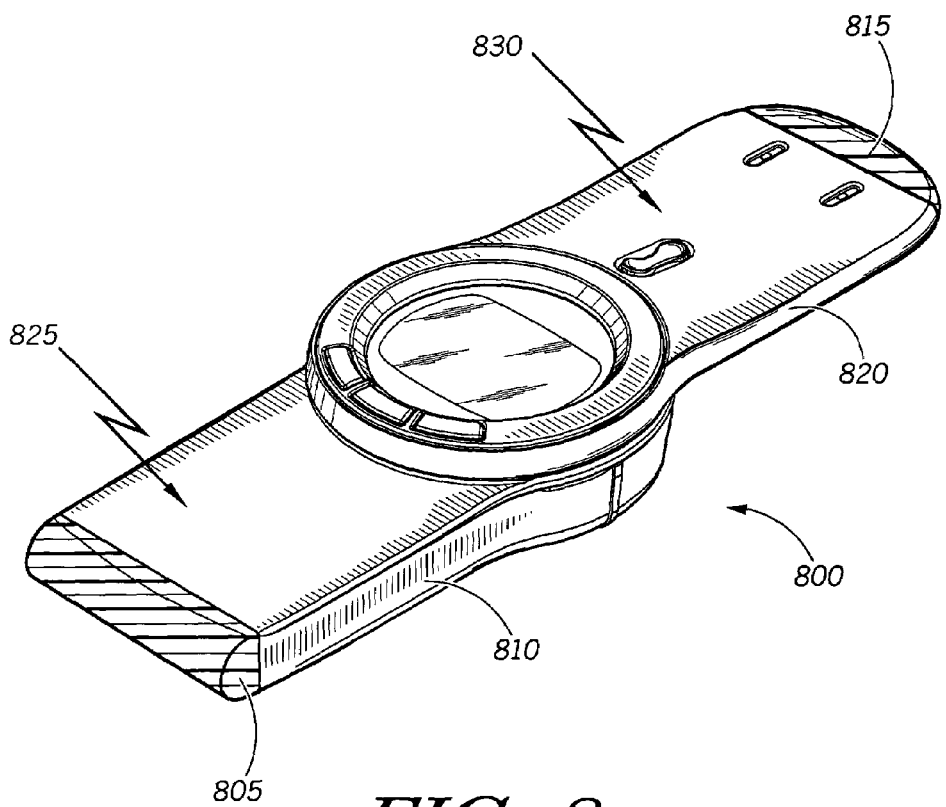
FIG. 8 is a perspective view of a third embodiment of a communication device with a movable housing in an opened position.
Figure 9:
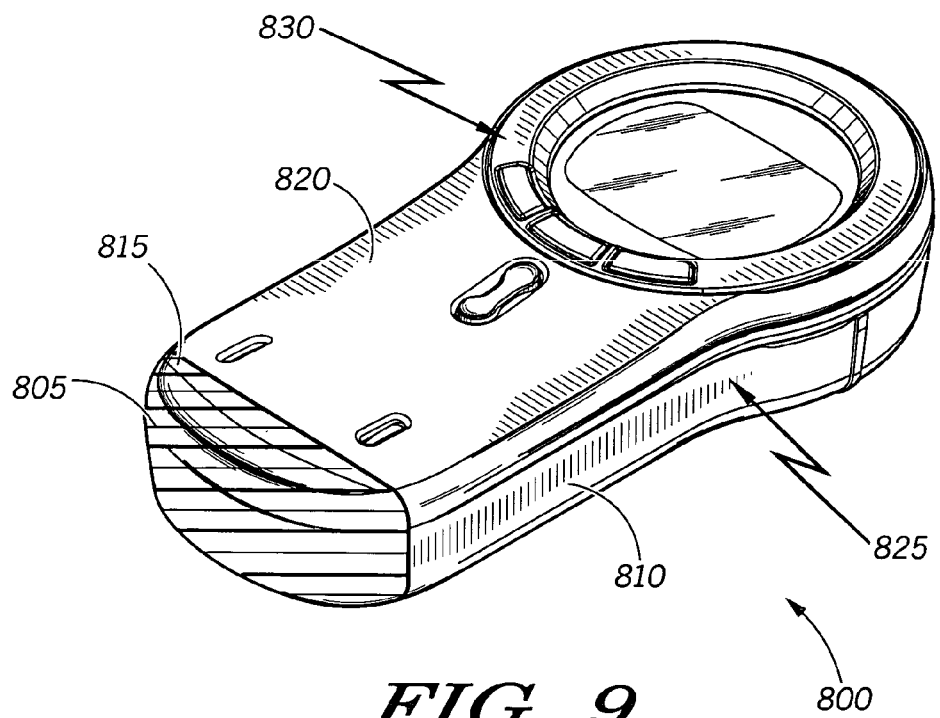
FIG. 9 is a perspective view of the communication device of FIG. 8 with a movable housing in a closed position.
Figure 10:
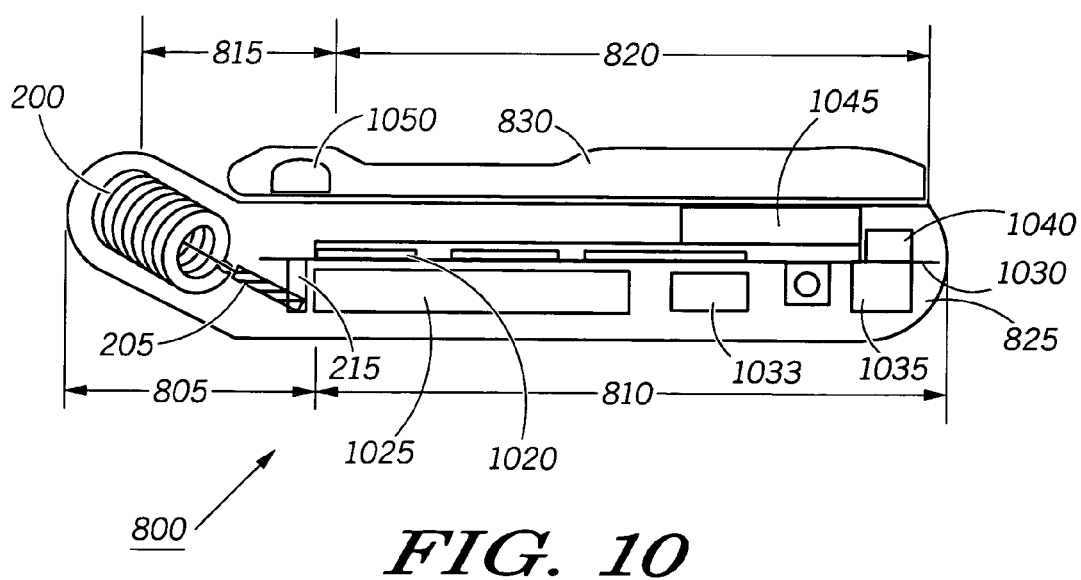
FIG. 10 is a cross sectional view of the communication device of FIG. 9.

FIGS. 8 through 10 illustrate a third embodiment of a communication device. Specifically, FIGS. 8 through 10 illustrate a blade-type communication device 800. As illustrated, the blade-type communication device 800 comprises a base housing 825 and a rotating blade housing 830. The rotating blade housing 830 preferably is mechanically coupled to the base housing 825 such that the rotating blade housing 830 revolves in a plane parallel to the base housing 825 for opening and closing of the blade-type communication device 800. When the radiotelephone is in use, the two planar elements are opened in relation to each other, exposing such elements as a keypad; microphone and/or speaker (see FIG. 8). When the radiotelephone is not in use, the two planar elements are closed and lie in parallel (see FIG. 9).

It will be appreciated by those of ordinary skill in the art that the base housing 825 and the blade housing 830 can each have, and/or contain printed circuit boards (PCBs) with electronic components, audio devices, camera's, visual displays, metal shields, and metal chassis, as well as wiring to connect the electrical component together to form electrical circuits, and the like. For example, in accordance with the present invention, the base housing 825 and/or the blade housing 830 can contain at least a portion of the electronic system 300 as described previously herein and illustrated in FIG. 3.

Referring to FIGS. 8 and 9, the base housing 825 of the blade-type communication device 800, in accordance with the present invention, comprises at least one base metallic portion 810 and at least one base non-metallic portion 805. The base metallic portion 810 and the base non-metallic portion 805 are manufactured similarly to the metallic portion 110 and the non-metallic portion 105 as described previously herein for FIG. 1.

Similarly, the blade housing 830 of the blade-type communication device 800, in accordance with the present invention, comprises at least one blade metallic portion 820 and at least one blade non-metallic portion 815. The blade metallic portion 820 and the blade non-metallic portion 815 are manufactured similarly to the metallic portion 110 and the non-metallic portion 105 as described previously herein for FIG. 1.

As illustrated in FIG. 9, when the blade assembly is in the closed position, the base metallic portion 810 and the blade metallic portion 820 preferably are substantially coincidental. Similarly, when the blade assembly is in the closed position, the base non-metallic portion 805 and the blade non-metallic portion 815 are substantially coincidental.

FIG. 10 illustrates a cross sectional view of the blade-type communication device 800 of FIGS. 8 and 9. Specifically, FIG. 10 illustrates a cross sectional view of the blade-type communication device 800 in the closed position as illustrated previously in FIG. 9. As illustrated, the blade-type communication device 800 includes the base housing 825, the blade housing 830, and a plurality of internal components. The plurality of internal components preferably includes the electronic system 300 as described previously herein. It will be appreciated by those of ordinary skill in the art that at least a portion of the plurality of internal components can be contained within the base housing 825, within the blade housing 830, or within a combination of both. The plurality of internal components, for example can include a radio frequency (RF) transceiver 1020, (or alternatively a separate RF transmitter and RF receiver (not shown)) a battery 1025, a SIM (Subscriber Identity Module) card 1033, a speaker 1050, a display 1045, a vibrator 1040, a battery charger plug and accessories interface 1035, and the like. The plurality of internal components, in accordance with the present invention, preferably further includes the resonator 200, the antenna shaft 205, and the antenna fork 215 as described previously herein. The plurality of internal components further includes, as described previously herein, various components providing functionality of a controller, one or more filters, a frequency synthesizer, a signal processor, and the like. One or more printed circuit boards 1030 provides electrical connection and mechanical structure between the plurality of internal components within the blade-type communication device 800 as illustrated.

The present invention provides for placement of an internal antenna cluster in different embodiments of metallic housings for various communication devices. The internal antenna cluster can be, as illustrated, positioned at the bottom end of different types of embodiments of communication devices. The embodiments preferably include metallic cases that cover the electronics of the communication device with the exception of the volume in which the antenna cluster is placed. For those embodiments containing movable housings such as flips, blades or U-type of mobile parts, where the metallic case covers the keypad. The volume that overlaps the antenna cluster is free from metal. Preferably, the antenna cluster is tilted towards the keypad if needed to reduce antenna detuning due to the user's hand or when the communication device is lying over a flat surface. The embodiment and the antenna cluster when tilted create an acoustic cavity around the device's microphone that helps the voice reception, loudness and isolation when used in noisy environments.

The present invention as described and illustrated herein provides a highly efficient electromagnetic device with internal antenna. The antenna cluster makes the full embodiment to radiate and receive electromagnetic signals (including flips, blades and U-flips if any). The overall antenna is created by the main resonator (antenna) and the antenna cluster together acting as the resonator (frequency selector).

The antenna effective radiation area is proportional to its physical size. Therefore, by using one hundred percent (100%) of the embodiment area the system becomes highly efficient.

As described, the present invention, including utilizing an antenna system having one or more antenna resonators and accompanying elements located within a non-metallic portion of a communication device housing along in conjunction with a metallic portion of the communication device housing provides a low Specific Absorption Ratio (SAR) and high efficiency antenna system having a multi-band response that is well suited to serve communication systems such as GPRS systems. It further provides an antenna system that also can be use indistinctly for WLAN, GSM, TDMA, AMPS and 3G systems using same or similar form factors. The invention, as described herein, enables an internal antenna compatible with metallic housings thereby providing a low volume solution for a variety of form factors. Due to its low sensitivity to accessories and features, the present invention is further well suited for implementing video cameras and other accessories into wireless communication devices while retaining acceptable radio frequency performance. By providing an internal antenna component, the present invention reduces the likelihood of a user touching the antenna, making the communication device less prone to disconnecting due to a change in radio frequency performance.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication device comprising:
   a housing comprising:
      at least one metallic portion, and
      at least one non-metallic portion; and
   an antenna system for tuning the communication device to radiate at one or more frequencies, wherein the antenna system is located within the non-metallic portion of the housing, wherein the antenna system comprises:
      a first resonator, and
      one or more antenna elements;
      wherein the antenna system is electromagnetically coupled to the at least one metallic portion, and further wherein the at least one metallic portion is a second resonator for the antenna system.

2. A communication device as recited in claim 1 wherein the antenna system comprises a plurality of antennas, wherein each of the plurality of antennas provides operation on at least one frequency band.

3. A communication device as recited in claim 1 wherein the antenna system comprises a plurality of antennas, wherein each of the plurality of antennas provides operation using at least one communication protocol.

4. A communication device as recited in claim 1 wherein the antenna system comprises a plurality of antennas, and further wherein the plurality of antennas is contained within a dielectric over-mold.

5. A communication device as recited in claim 4 wherein each of the plurality of antennas has an independent frequency output.

6. A communication device as recited in claim 1 wherein the antenna system comprises a plurality of antennas, and further wherein the performance of the antenna system is controlled using one or more attributes chosen from the group of attributes consisting of distance, placement, technology, and number of elements used in the antenna system.

7. A communication device as recited in claim 1 further comprising a keypad, wherein the antenna system is tilted towards the keypad.

8. A communication device comprising:
   a housing comprising:
      a first housing portion comprising:
         at least one first housing metallic portion, and
         at least one first housing non-metallic portion;
      a second housing portion rotatably coupled to the first housing, the second housing comprising:
         at least one second housing metallic portion, and
         at least one second housing non-metallic portion; and
   an antenna system for tuning the communication device to radiate at one or more frequencies, wherein the antenna system is located within the at least one first housing non-metallic portion of the housing.

9. A communication device as recited in claim 8 wherein the antenna system is further located within the at least one second housing non-metallic portion.

10. A communication device as recited in claim 9 wherein the antenna system comprises:
    a first resonator, and
    one or more antenna elements;
    wherein the antenna system is electromagnetically coupled to the at least one first housing metallic portion, and further wherein the at least one first housing metallic portion is a second resonator for the antenna system.

11. A communication device as recited in claim 10 wherein the antenna system is further electromagnetically coupled to the at least one second housing metallic portion, and further wherein the at least one second housing metallic portion is a third resonator for the antenna system.

12. A communication device as recited in claim 8 wherein the antenna system comprises a plurality of antennas, wherein each of the plurality of antennas provides operation on at least one frequency band.

13. A communication device as recited in claim 8 wherein the antenna system comprises a plurality of antennas, wherein each of the plurality of antennas provides operation using at least one communication protocol.

14. A communication device as recited in claim 8 wherein the antenna system comprises a plurality of antennas, and further wherein the plurality of antennas is contained within a dielectric over-mold.

15. A communication device as recited in claim 14 wherein each of the plurality of antennas has an independent frequency output.

16. A communication device as recited in claim 8 wherein the antenna system comprises a plurality of antennas, and further wherein the performance of the antenna system is controlled using one or more attributes chosen from the group of attributes consisting of distance, placement, technology, and number of elements used in the antenna system.

17. A communication device as recited in claim 8 further comprising a keypad, wherein the antenna system is tilted towards the keypad.

* * * * *